(12) United States Patent
Lvov et al.

(10) Patent No.: US 8,507,056 B2
(45) Date of Patent: Aug. 13, 2013

(54) MICRORESERVOIR WITH END PLUGS FOR CONTROLLED RELEASE OF CORROSION INHIBITOR

(75) Inventors: Yuri M. Lvov, Ruston, LA (US); Elshad Abdullayev, Ruston, LA (US)

(73) Assignee: Louisiana Tech University Research Foundation, a division of Louisiana Tech University Foundation, Inc., Ruston, LA (US)

( * ) Notice: Subject to any disclaimer, the term of this patent is extended or adjusted under 35 U.S.C. 154(b) by 392 days.

(21) Appl. No.: 12/795,984

(22) Filed: Jun. 8, 2010

(65) Prior Publication Data

US 2011/0297038 A1 Dec. 8, 2011

(51) Int. Cl.
  *B29D 22/00* (2006.01)
  *C04B 9/02* (2006.01)

(52) U.S. Cl.
  USPC ..................... 428/34.1; 106/14.05

(58) Field of Classification Search
  USPC ............. 428/34.1, 34.4; 106/14.05
  See application file for complete search history.

(56) References Cited

U.S. PATENT DOCUMENTS

| | | |
|---|---|---|
| 5,492,696 A | 2/1996 | Price et al. |
| 5,651,976 A | 7/1997 | Price et al. |
| 5,705,191 A | 1/1998 | Price et al. |
| 6,013,206 A | 1/2000 | Price et al. |
| 6,280,759 B1 | 8/2001 | Price et al. |
| 6,401,816 B1 | 6/2002 | Price et al. |
| 6,936,215 B1 | 8/2005 | Price et al. |
| 7,125,476 B2 | 10/2006 | Schoen et al. |
| 7,400,490 B2 | 7/2008 | Gunderman et al. |
| 7,491,263 B2 | 2/2009 | Wang et al. |
| 2008/0248201 A1 | 10/2008 | Corkery et al. |
| 2009/0078153 A1 | 3/2009 | Shchukin et al. |

OTHER PUBLICATIONS

Abdullayev et al.; "Halloysite Tubes as Nanocontainers for Anticorrosion Coating with Benzotriazole"; Applied Materials & Interfaces vol. 1 No. 7 1437-1443; Jun. 10, 2009.*
STIC search; Jan. 4, 2013.*
Y. Lvov, et al., Halloysite Clay Nanotubes for Controlled Release of Protective Agents, ACS Nano, 2008, pp. 814-820, vol. 2, No. 5, American Chemical Society.
N. Veerabadran, Clay Nanotubes for Encapsulation and Sustained Release of Drugs, NANO: Brief Reports and Reviews, 2007, pp. 1-6, vol. 2, No. 2, World Scientific Publishing Company.

* cited by examiner

*Primary Examiner* — James Yager
(74) *Attorney, Agent, or Firm* — Jones Walker LLP

(57) ABSTRACT

A corrosion inhibiting structure includes a mineral tubule having a first end, a second end, and a lumen extending from the first end to the second end. The lumen terminates in a first opening at the first end and a second opening at the second end. The corrosion inhibiting structure also includes an anticorrosion deposit disposed within the lumen, and first and second precipitate stoppers covering the first and second openings, respectively. A coating composition includes a population of corrosion inhibiting structures and a coating material. A method of inhibiting corrosion includes loading anticorrosion agent deposits into lumens, forming stoppers at first and second openings by mixing loaded mineral tubules with a solution containing a predetermined concentration of transition metal ions, mixing the loaded mineral tubules having stoppers with a coating material to form a composite material, and applying the composite material to a metal surface.

10 Claims, 7 Drawing Sheets

MICRORESERVOIR WITH END PLUGS FOR CONTROLLED RELEASE OF CORROSION INHIBITOR

FIELD OF THE INVENTION

The present invention generally relates to a microreservoir structure for storing an anticorrosion agent, and more particularly to a tubular microreservoir with end plugs to slow the release rate of an anticorrosion agent from within a lumen of the tubular microreservoir.

BACKGROUND

Metals are often coated with paint or another coating material to prevent corrosion. If the coating is scratched or otherwise removed from an area, however, the underlying metal surface could be exposed to a corrosive environment. To solve this problem, inhibitor-enhanced coatings have been developed. Corrosion inhibitors are released from the inhibitor-enhanced coatings upon the occurrence of a triggering event, such as a change in pH. If the surrounding environmental conditions are corrosive, the pH changes after the paint or other coating is scratched or otherwise removed.

Inorganic corrosion inhibitors include chromates, phosphates, molybdates, and nitrites. One of the main disadvantages of inorganic inhibitors is their toxicity. In fact, some inorganic inhibitors have been proven to cause diseases.

Benzotriazole and its derivatives are some of the most effective corrosion inhibitors for the protection of metals, especially copper and transition metals. These corrosion-inhibitors are not toxic like the inorganic inhibitors discussed above. The corrosion-inhibiting performance of benzotriazole in some environments, e.g. seawater, is not alone sufficient to prevent the corrosion of metals. Instead, benzotriazole must be combined with a passive protection mechanism, e.g. paint coating.

Because benzotriazole is partially water-soluble, it can leach out from the coating upon exposure to the water. The direct combination of benzotriazole and paint may form voids in the paint coating layer. These voids diminish the protective qualities of the paint layer. Increased anticorrosion performance is achieved by placing benzotriazole within nano- or microscale encapsulating systems and adding the benzotriazole-containing encapsulating system into the paint. The nano- or microscale encapsulating systems include polyelectrolyte and polymer microcapsules, sol-gel nanoparticles, porous silica, and nanotubes.

Prior research has explored the storage of benzotriazole within halloysite clay tubules and the addition of the benzotriazole-loaded halloysite tubules into paint. Ordinarily, benzotriazole is quickly released from the halloysite tubules, but a sustained release of benzotriazole is desirable for prolonged corrosion inhibition.

U.S. Patent Application Publication No. 2009/0078153 to Shchukin et al. (incorporated herein by reference) describes a process of loading a solid substrate (e.g., metal nanoparticles, metal oxide nanoparticles, metal oxide nanotubes, carbon nanotubes, or halloysite nanotubes) with a corrosion inhibitor (e.g., quinaldic acid or mercaptobenzotriazole); coating the solid substrate with a polymer or polyelectrolyte shell using the layer-by-layer deposition technique; and adding the coated nanoreservoir into paint. The polymer or polyelectrolyte shell prevents the release of the corrosion inhibitor from the nanotubes until the polymer or polyelectrolyte shell is triggered by an event to which the particular polymer or polyelectrolyte shell is sensitive (e.g., change of pH, ionic strength, temperature, humidity, light, or mechanical stress). However, the layer-by-layer deposition technique does not lend itself to large-scale manufacturing. Also, the loading efficiency of these capsules are low and often not sufficient for long-term corrosion protection.

SUMMARY OF SELECTED EMBODIMENTS OF INVENTION

One embodiment of the present invention is a corrosion inhibiting structure that includes a deposit of an anticorrosion agent disposed within a lumen of a mineral tubule. The openings of the lumen are plugged by substantially insoluble metal-inhibitor complexes formed by the interaction of the anticorrosion agent and transition metal ions. The plugs prevent the release of the anticorrosion agent from the lumen until the plug begins to dissipate. This embodiment of the present invention provides for an extended release of the anticorrosion agent.

Another embodiment of the present invention is a corrosion inhibiting structure including a mineral tubule, a deposit of an anticorrosion agent, a first precipitate stopper, and a second precipitate stopper. The mineral tubule has a first end, a second end, and a lumen extending from the first end to the second end. The lumen terminates in a first opening at the first end of the mineral tubule, and in a second opening at the second end of the mineral tubule. The deposit of anticorrosion agent is disposed within the lumen. The first precipitate stopper covers the first opening, and the second precipitate stopper covers the second opening.

In a further embodiment, the first and second precipitate stoppers are formed by the interaction of anticorrosion agent leaking from the lumen and transition metal ions disposed outside of the mineral tubule. In an alternate embodiment, the deposit also includes a polyelectrolyte. In this alternate embodiment, the first and second precipitate stoppers are formed by the interaction of the polyelectrolyte leaking from the lumen and counter-polyelectrolytes disposed outside of the mineral tubule.

In a further embodiment, a bulk population of the corrosion inhibiting structures described above is mixed with a coating material, such as paint. A metal surface is coated with the mixture. The mixture prevents corrosion of the metal surface.

BRIEF DESCRIPTION OF THE SEVERAL VIEWS OF THE DRAWINGS

In consideration of the following detailed description, various embodiments are described in connection with the following drawings.

DETAILED DESCRIPTION OF THE SELECTED EMBODIMENTS

Figure 1:
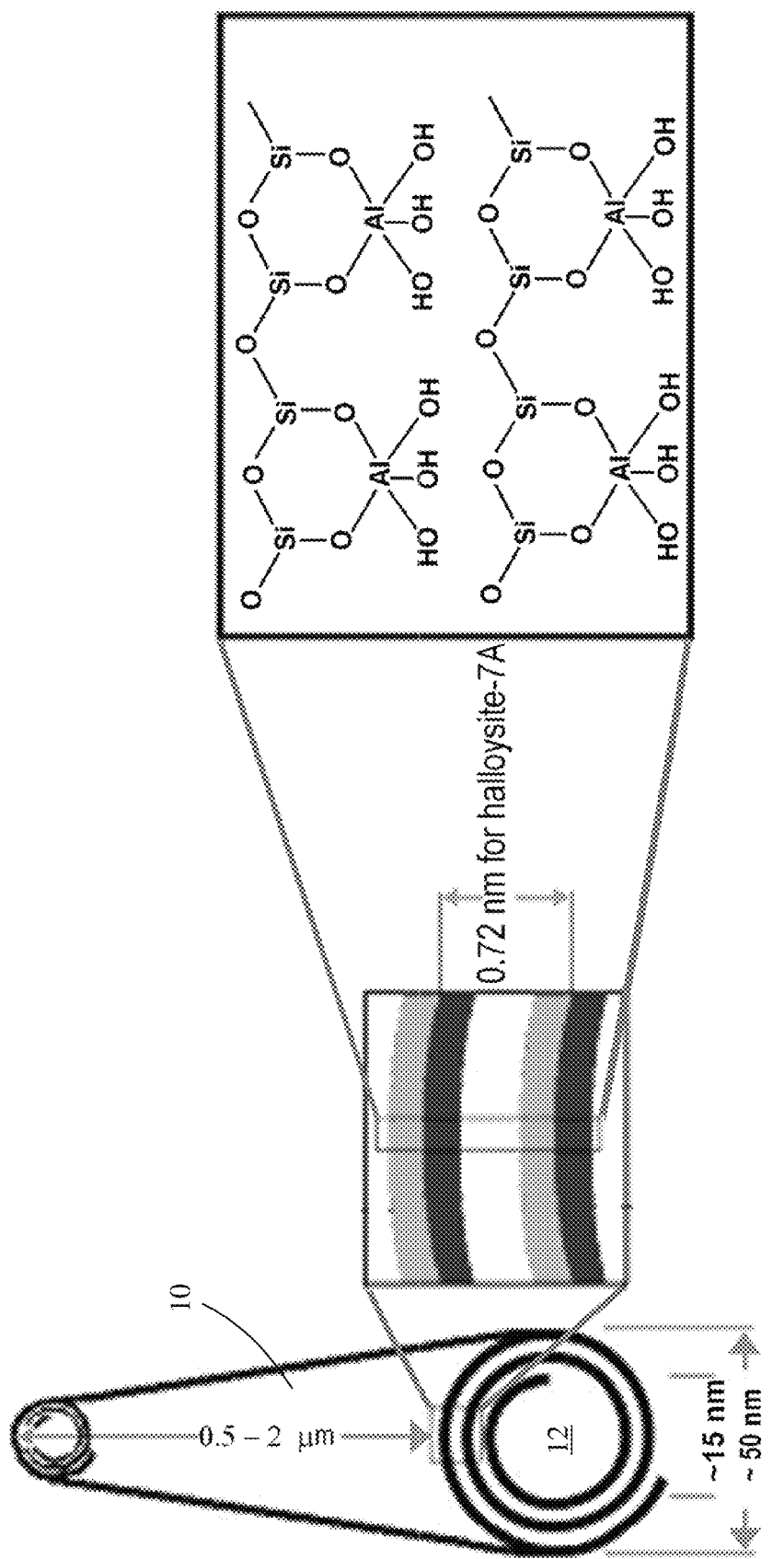
FIG. 1 is a schematic representation of a halloysite tubule and the chemical structure of its layers.

Halloysite ($Al_2Si_2O_5(OH)_4 \times nH_2O$) is an aluminosilicate that exhibits a hollow tubular structure in the submicron range. When n=2, halloysite is in the form of hydrated halloysite-10 Å with one layer of water molecules between the multiple layers of halloysite. When n=0, halloysite is in the form of dehydrated halloysite-7 Å. The dehydrated form is achieved by heating halloysite to 100-120° C., at which temperature the halloysite experiences an irreversible phase transition with a loss of water. Dehydrated halloysite-7 Å will be discussed further below, and will be referred to as "halloysite." Halloysite tubules are usually 500-1,500 nm in length, approximately 15-50 nm in inner diameter (or lumen diameter), and approximately 50-200 nm in outer diameter, as illustrated in FIG. 1. Halloysite tubules 10 may be referred to as microtubules (i.e., tubule structures having length and diameter dimensions in the range of 1 nm to 100 μm). The lumens 12 of halloysite tubules 10 may serve as microreservoirs (i.e., reservoirs having average dimensions in the range of 1 nm to 100 μm).

Figure 2:
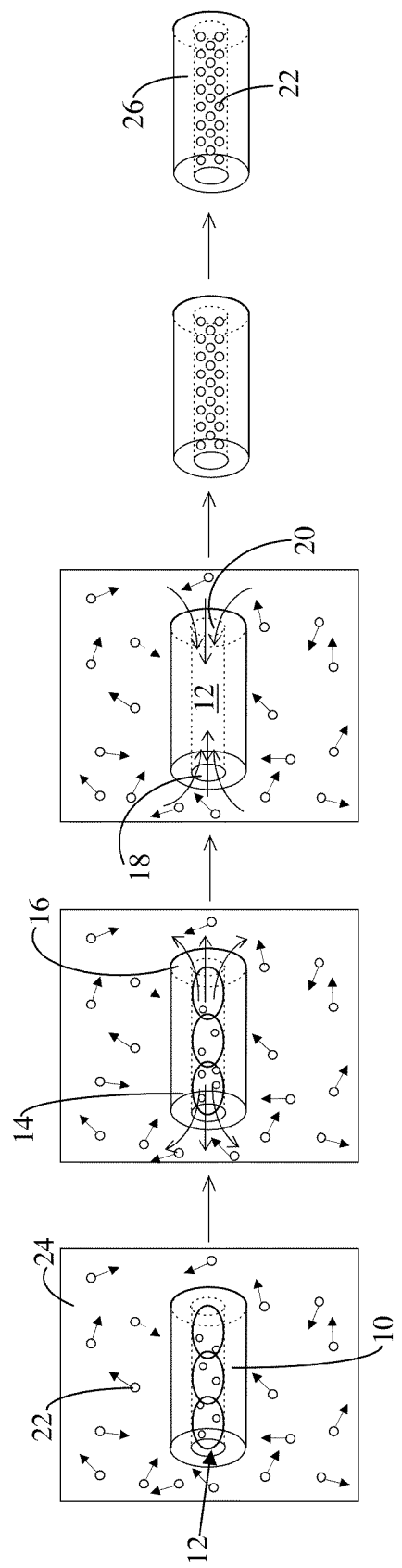
FIG. 2 is a schematic representation of the method of loading a corrosion inhibitor into a tubule.

As shown in FIG. 2, each halloysite tubule 10 may have first end 14 and second end 16. Lumen 12 may be a space extending from first end 14 to second end 16 of tubule 10, and may terminate at first opening 18 and second opening 20. Anticorrosion agent 22 may be loaded into lumen 12 of each halloysite tubule 10 by mixing halloysite as a dry powder with a saturated solution of anticorrosion agent 22 in a solvent 24. Anticorrosion agent 22 may be any type of anticorrosion agent capable of being loaded into halloysite tubules 10 (or any tubules of any other minerals), including benzotriazole, 8-hydroxyquinoline, 2-mercaptobenzothiazole, 2-mercaptobenzimidazole, or any other corrosion inhibitor that forms a protective layer on a metal surface by forming a metal-inhibitor complex film. Almost all organic corrosion inhibitors form a protective layer on metal surfaces by forming metal-inhibitor complex films. The use of benzotriazole will be discussed below. The present invention is not limited to the use of benzotriazole as anticorrosion agent 22.

Benzotriazole 22 may be loaded into lumen 12 of each halloysite tubule 10 by mixing halloysite as a dry powder with a saturated solution of benzotriazole 22 in a solvent 24. Solvent 24 may be acetone, water, ethyl alcohol, an ether, or any other solvent having a low viscosity that dissolves benzotriazole 22 (or other anticorrosion agent 22 used) and disperses halloysite tubules 10 into an at least partially stable colloid. Alternatively, melted benzotriazole may be mixed with a halloysite dry powder. In a preferred embodiment, halloysite dry powder is mixed with a saturated solution of benzotriazole in acetone (80 mg/mL). The dry powder halloysite may be in the form of dehydrated tubules having the approximate sizes of 50 nm external diameter, 15 nm inner diameter, and 500-1000 nm length.

Referring still to FIG. 2, the suspension of halloysite dry powder and benzotriazole 22 in solvent 24 may be placed in a vacuum jar, and the air may be evacuated from lumens 12 of halloysite tubules 10 using a vacuum pump. Slight fizzing may be observed, which indicates that air is being removed from lumens 12 of halloysite tubules 10. The suspension may be kept under vacuum conditions for one to five hours before being returned to atmospheric pressure. To increase loading efficiency, the vacuum process may be repeated. Fresh solvent may be added if the suspension is dried under vacuum. In a preferred embodiment, the vacuum process is repeated three times. Loaded halloysite tubules 26 may then be separated from the suspension by centrifugation, as understood by one skilled in the art. After separation, loaded halloysite tubules 26 may be washed with water to remove benzotriazole 22 from the exterior surfaces of loaded halloysite tubules 26, and then dried, as shown in FIG. 2.

Loaded halloysite tubules 26 may retain benzotriazole 22 for a long period of time until being exposed to a liquid in which benzotriazole 22 is partially or completely soluble (e.g., water, acetone, or ethyl alcohol). This may occur where loaded halloysite tubules 26 are added to paint, which may be used to coat a metal to protect the metal from a corrosive environment, such as seawater. If the paint coating is scratched, loaded halloysite tubules 26 may be exposed to the corrosive environment. At this point, the release of benzotriazole 22 from loaded halloysite tubules 26 may begin. Released benzotriazole 22 may prevent corrosion of any exposed area of the metal surface.

Figure 3:
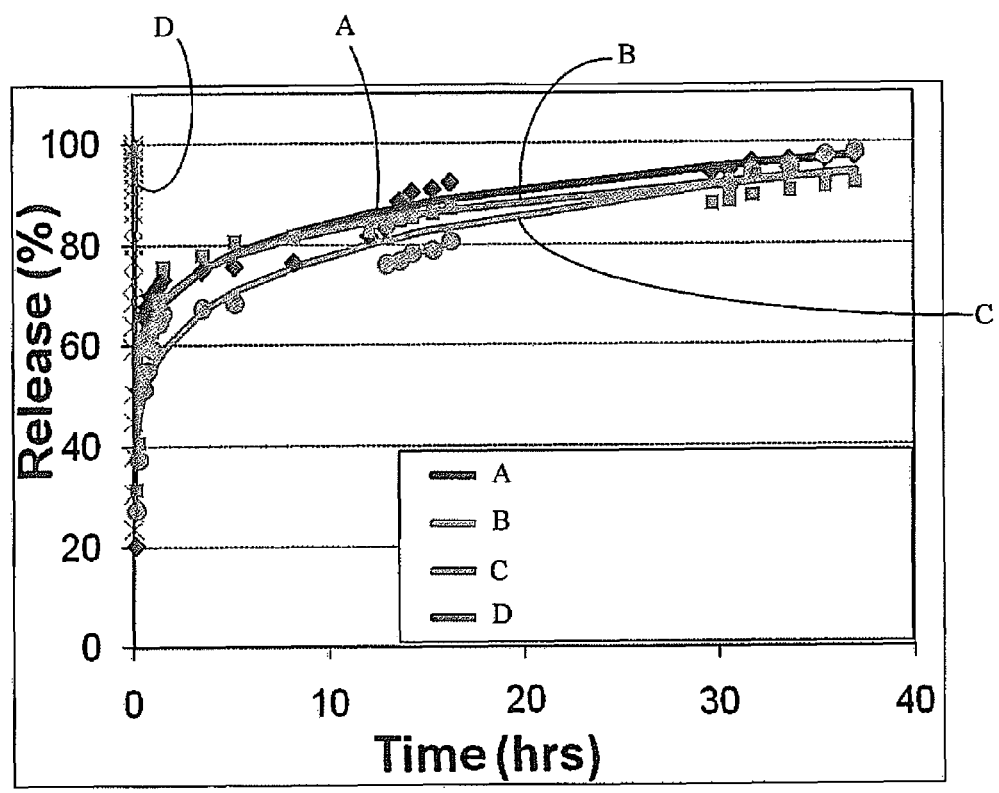
FIG. 3 is a graphical representation of the benzotriazole release profile measurements of two halloysite samples.

FIG. 3 is a graphical representation of release profile measurements of benzotriazole 22 from loaded halloysite tubules 26 in water. Curves A, B, and C show the measurements obtained from first, second, and third samples of benzotriazole-loaded halloysite tubules 26, respectively, placed in water. For comparison, curve D shows the measurements obtained when benzotriazole 22 alone is placed in water. The near vertical orientation of curve D indicates that benzotriazole dissolves very quickly in water. Curves A, B, and C are close to one another, all indicating almost complete release of benzotriazole 22 from loaded halloysite tubules 26 within 40 hours. Within the first 5 hours, 70% of benzotriazole 22 was released from loaded halloysite tubules 26. Over the subsequent 35 hours, the remaining 30% of benzotriazole 22 was released. FIG. 3 indicates that loading benzotriazole 22 within lumens 12 of halloysite tubules 10 slows the dissolution of benzotriazole 22 within water. Instead of very rapid dissolution, as shown by curve D, benzotriazole 22 was distributed over almost 40 hours.

Release profile measurements of benzotriazole 22 from loaded halloysite tubules 26 in the two samples were fit to the Peppas model, reproduced below:

$$\frac{M_t}{M_\infty} = \kappa t^n$$

where $M_t$ is the amount of material released at time t, $M_\infty$ is the amount of material released at infinite time, n is the exponent characteristic of the released mechanism, and k is a constant. For the release of benzotriazole 22 from loaded halloysite tubules 26, the value of k is 66±3 and the value of n is 0.12±0.02. These values of k and n are based on halloysite tubules with 15 nm inner diameter, 50 nm external diameter, and 500-1000 nm length. Other values of k and n may be observed for samples of halloysite tubules having different dimensions. The release of benzotriazole 22 from loaded halloysite tubules 26 was determined by the same mechanism in both samples (represented by curves A and B in FIG. 3). These results indicate that the release rate of benzotriazole 22 was determined by the geometry of halloysite tubules 10 in both samples. For comparison, the release rate of benzotriazole 22 from naked crystals fits the Peppas model with a k value of 514.4 and an n value of 0.64. As discussed above, the dissolution of benzotriazole 22 in water is slowed by the loading of benzotriazole 22 in lumens 12 of halloysite tubules 10.

Figure 4:
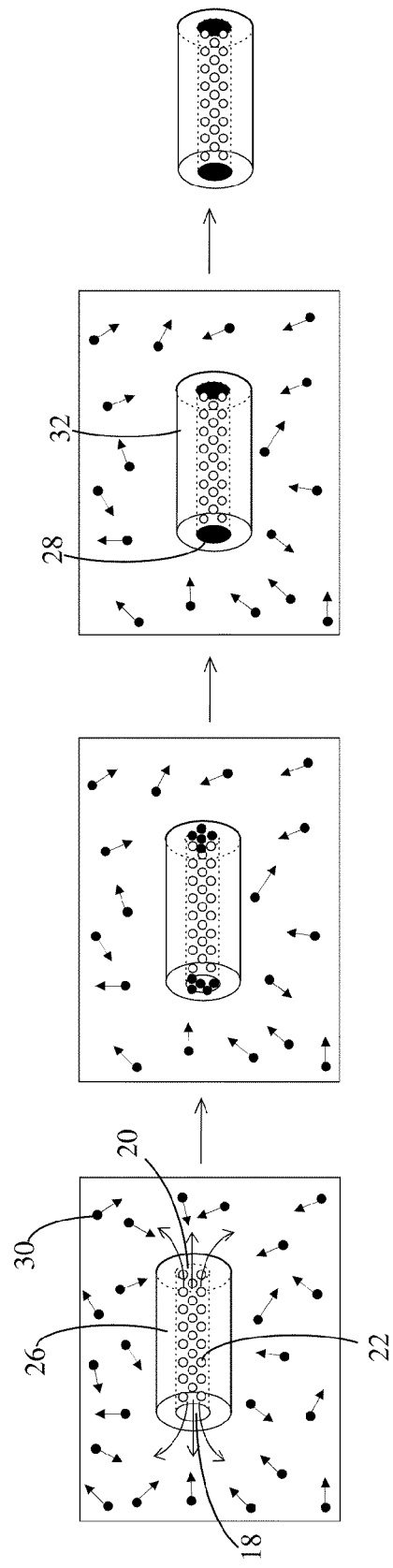
FIG. 4 is a schematic representation of the method of forming end plugs at the two openings of the halloysite tubule lumen.

Referring now to FIG. 4, end plugs 28 (sometimes referred to as stoppers) may be formed by rinsing benzotriazole-loaded halloysite tubules 26 with an aqueous solution containing transition metal ions 30. Benzotriazole 22 leaking from first opening 18 and second opening 20 of lumen 12 interacts with transition metal ions 30 diffusing into first opening 18 and second opening 20 to form a metal-benzotriazole complex (a salt-precipitate) that is substantially insoluble in water, liquid hydrocarbons, ethers, and many other organic solvents. The metal-benzotriazole complex may have a solubility value of less than $10^{-9}$ M in water. The metal-benzotriazole complex is not stable in ammonia solutions or acids. The metal-benzotriazole complex forms end plugs 28 that prevent benzotriazole 22 from being released from lumens 12 of loaded halloysite tubules 26 until end plugs 28 dissipate. Plugging loaded halloysite tubules 26 may be required to avoid leakage of benzotriazole 22 in liquid paint during storage (where loaded halloysite tubules 26 have been added to liquid paint) or to avoid fast leaking of benzotriazole 22 to external corrosive environment, where rapid circulation of water may occur. Plugging is especially useful for avoiding initial burst during the release of a corrosion inhibitor from mineral tubules. Due to quick release at initial stages, very small amounts of corrosion inhibitor may remain within the lumen of the mineral tubules which may be insufficient for corrosion protection at later times.

Only a short rinsing is required to form end plugs 28. In a preferred embodiment, loaded halloysite tubules 26 are rinsed for one minute with a bulk aqueous solution containing copper(II) or other ions, the suspension is constantly stirred, and the plugged loaded halloysite tubules 32 are separated from solution by centrifugation. In FIG. 4, transition metal ions 30 may be copper(II) ions, iron(II) ions, iron (III) ions, cobalt(II) ions, or any other metal ions that form a stable 2D complex with benzotriazole 22. In a preferred embodiment, transition metal ions 30 are copper(II) ions.

Figure 5:
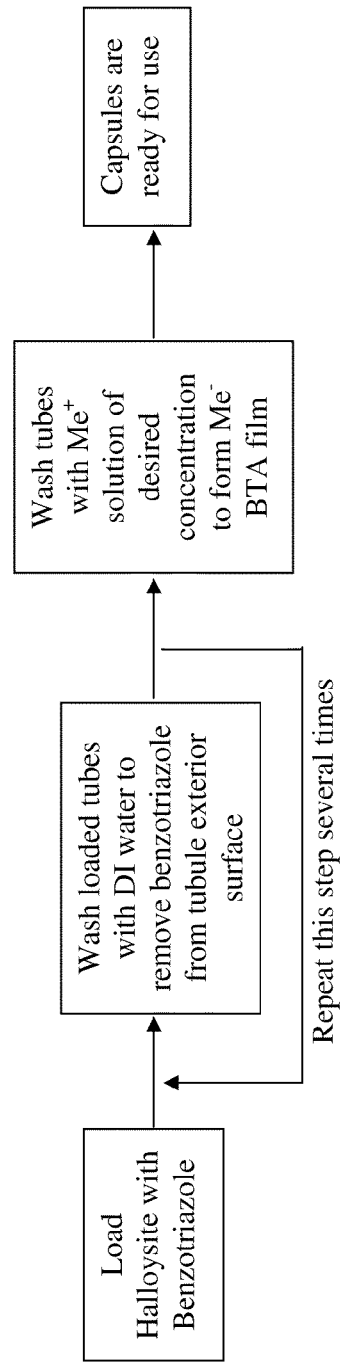
FIG. 5 is a schematic representation of the method of loading the corrosion inhibitor into the halloysite tubule and forming end plugs at the two openings of the halloysite tubule lumen.

FIG. 5 illustrates the method of preparing plugged loaded halloysite tubules 32 as described above. First, halloysite tubules 10 are loaded with benzotriazole 22. Loaded halloysite tubules 26 are rinsed one or more times with water to remove benzotriazole 22 from the exterior surfaces of loaded halloysite tubules 26. Loaded halloysite tubules 26 are then rinsed with an aqueous solution containing transition metal ions 30 to form metal-benzotriazole complex end plugs 28 at first opening 18 and second opening 20 of lumen 12. This process is capable of being carried out in large-scale manufacturing.

The presence of a large amount of corrosion inhibitor on the external surface of the tubule may lead to the complete encapsulation of the entire tubule, including tubule external walls and tubule openings, with a thin film of the metal-inhibitor complex. This was confirmed by an SEM image of a halloysite tubule loaded with 2-mercaptobenzimidazole (a corrosion inhibitor with a structure similar to benzotriazole). This method of encapsulating the entire tubule surface including openings 18, 20 of lumen 12 will reduce the release rate of the corrosion inhibitors deposited in lumen 12 or in any other defect located on the exterior of the tubule.

Figure 6:
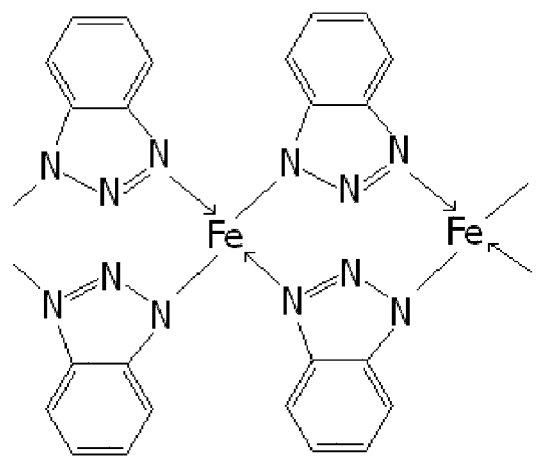
FIG. 6 is a schematic representation of the chemical structure of an iron (II)-benzotriazole complex.
Figure 7:
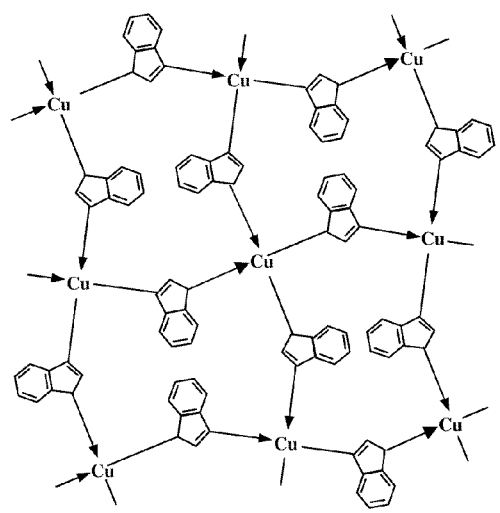
FIG. 7 is a schematic representation of the chemical structure of a copper (II)-benzotriazole complex.

Benzotriazole 22 forms stable 2D complexes with most transition metals. FIG. 6 illustrates the chemical structure of iron(II)-benzotriazole complex. FIG. 7 illustrates the chemical structure of copper(II)-benzotriazole complex.

Figures 8, 9:
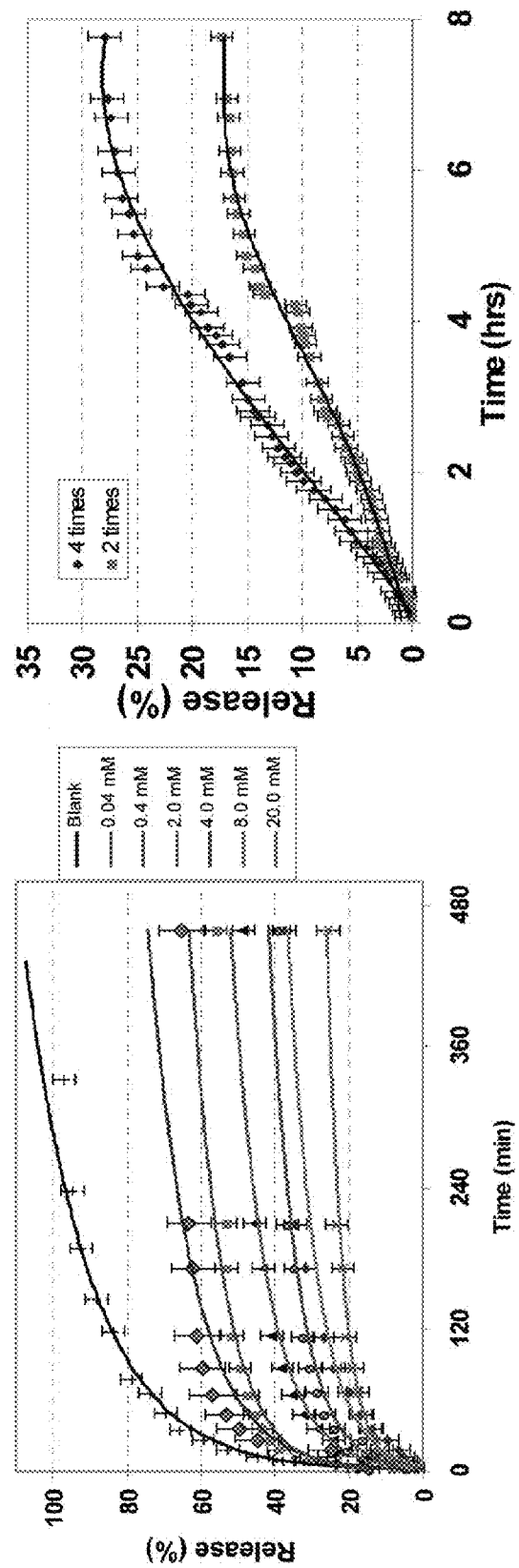
FIG. 8 is a graphical representation of benzotriazole release profile measurements from halloysite washed with copper sulfate solutions of different concentrations.
FIG. 9 is a graphical representation of benzotriazole release profile measurements from halloysite after two and four washing stages.
Figure 10:
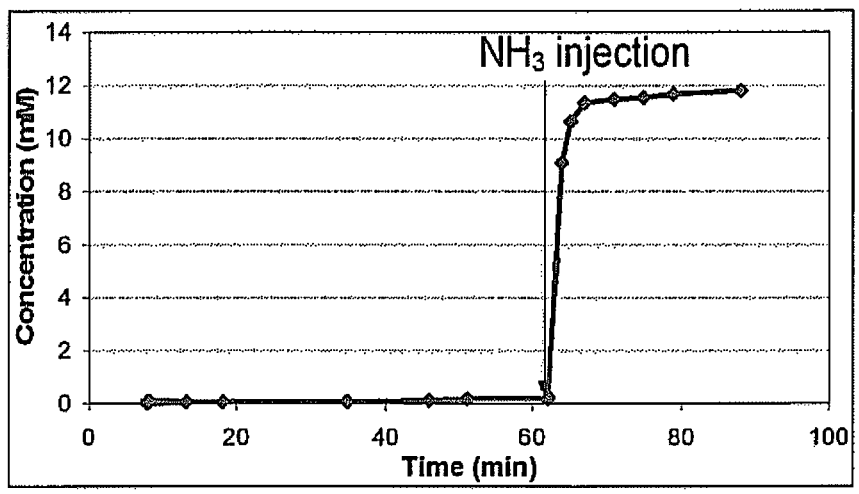
FIG. 10 is a graphical representation of benzotriazole concentration in a solution before and after injection of ammonia.

The release rate of benzotriazole 22 from plugged loaded halloysite tubules 32 may be affected by the chemistry and morphology of halloysite tubules 10, the concentration and type of transition metal ions 30 used, and the concentration of benzotriazole 22 available at first opening 18 and second opening 20 to form the metal-benzotriazole complex. FIG. 8 is a graphical representation of the measured release rate of benzotriazole 22 from plugged loaded halloysite tubules 32. Loaded halloysite tubules 26 were washed with solutions containing different concentrations of copper(II) ions. Each curve represents the release rate of benzotriazole 22 from plugged loaded halloysite tubules 26 in which end plugs 28 were formed from a solution containing a predetermined concentration of copper(II) ions. The top curve represents the release rate of benzotriazole 22 from unrinsed loaded halloysite tubules 26 (i.e., a "blank sample"). Benzotriazole 22 was completely released in the blank sample in approximately 300 minutes (5 hours). The second curve represents the release rate of benzotriazole 22 after the loaded halloysite tubules 26 were rinsed with a 0.04 mM aqueous solution of copper sulfate (i.e., the concentration of copper(II) ions is 0.04 mM). As understood by one skilled in the relevant art, "M" is a unit of concentration equal to 1 mole of solute per liter of solution, and "mM" is a unit of concentration equal to $10^{-3}$ M.

After 220 minutes, 65% of benzotriazole 22 was released. The third curve through the seventh curve each represent the release rate of benzotriazole 22 after the loaded halloysite tubules 26 were rinsed with 0.4 mM, 2.0 mM, 4.0 mM, 8.0 mM, and 20.0 mM aqueous solutions of copper sulfate, respectively. After 220 minutes, the amounts of benzotriazole 22 released was 57%, 46%, 35%, 28%, and 23%, respectively. These results indicate that use of a solution containing a higher concentration of copper(II) ions slows the release of benzotriazole 22 from plugged loaded halloysite tubules 32.

FIG. 9 is another graphical representation of the measured release rate of benzotriazole 22 from plugged loaded halloysite tubules 32 in samples in which loaded halloysite tubules 26 were washed with water twice (bottom curve) and four times (top curve). In both samples, end plugs 28 were formed by rinsing loaded halloysite tubules 26 with an 8 mM aqueous solution of copper sulfate. After four hours, the first sample (washed only twice with water) released 20% of benzotriazole 22. After this amount of time, the second sample (washed four times with water) released 12% of benzotriazole 22. These results indicate that rinsing loaded halloysite tubules 26 with water more times decreased the concentration of benzotriazole 22 at first opening 18 and second opening 20 of lumen 12, rendering less benzotriazole 22 available for the formation of copper(II)-benzotriazole complex end plugs 28, resulting in weaker end plugs 28.

End plugs 28 formed at ends 14, 16 of tubules 10 may be removed using a concentrated ammonia solution. Decomposition of the copper(II)-benzotriazole complex ("Cu-BTA") occurs by the following reaction:

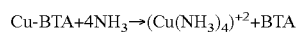

Cu-BTA+4NH$_3$→(Cu(NH$_3$)$_4$)$^{+2}$+BTA

Although this reaction is reversible, the equilibrium is shifted toward the reaction products (i.e., toward the decomposition of the copper(II)-benzotriazole complex) in the presence of excessive amounts of ammonia. As a result, the release of benzotriazole 22 occurs more rapidly. FIG. 8 illustrates the concentration of benzotriazole 22 in a solution containing plugged loaded halloysite tubules 32 before and after an injection of ammonia. Very little benzotriazole 22 was released before the injection of ammonia because of end plugs 28, as evidenced by the very low concentration of benzotriazole 22. The concentration of benzotriazole 22 in the solution sharply increased upon the injection of a saturated solution of ammonia in water. The ammonia dissolved the copper(II)-benzotriazole complex end plugs 28. The results illustrated in FIG. 8 indicate that benzotriazole 22 was released from the plugged loaded halloysite tubules 32 upon the injection of ammonia into the solution due to the decomposition of the copper(II)-benzotriazole complex end plugs 28 with ammonia.

Because halloysite tubules are compatible with a variety of water and oil-based coatings, plugged loaded halloysite tubules 32 may be mixed with paint (or another coating material) to form a composite coating. The coating material may be any type of paint into which clay-based inorganic fillers may be added, such as oil-based paint, epoxy-based paint, acrylic latex paint, and polyurethane paint. The composite coating may be applied to a metal surface for protection from corrosion. The paint passively protects the metal surface from corrosion by creating a barrier to the corrosive environment surrounding the metal surface. However, if the paint is chipped or scratched from the metal surface in an area, it will be exposed to the corrosive environment. End plugs 28 begin to dissipate when exposed to the corrosive environment, thereby beginning the release of benzotriazole 22. Released benzotriazole 22 will protect the newly exposed area of the metal surface from corrosion. End plugs 28 slow the release rate of benzotriazole 22, which will prolong the corrosion protection period after the scratch or other disturbance of the composite coating.

The formation of end plugs 28 through the reaction of a reagent leaking from lumen 12 of tubule 10 and counter-reagent in solution may also be applied by using polyelectrolytes (i.e., polycations and polyanions). In this embodiment, polycation may be loaded into lumens 12 of tubules 10 along with benzotriazole 22 (or other corrosion inhibitor 22 used) as shown in FIG. 2. To load benzotriazole 22 and polycation into lumen 12 of each halloysite tubule 10, halloysite in dry powder form may be mixed with a saturated solution of benzotriazole 22 and polycation in solvent 24. The concentration of polycation should not be more than 0.5 weight percent. A high concentration of polyelectrolyte reduces the viscosity of the solution, which is undesirable for good loading. Solvent 24 may be any ionic non-viscous solvent that dissolves benzotriazole 22 (or other anticorrosion agent 22 used) and disperses halloysite tubules 10 into a colloid (usually water). The suspension of halloysite dry powder, benzotriazole 22, and polycation in solvent 24 may be placed in a vacuum jar, and the air may be evacuated from lumens 12 of halloysite tubules 10 using a vacuum pump. The suspension may be kept under vacuum conditions for one to five hours before being returned to atmospheric pressure. This vacuum process may be repeated to increase loading efficiency. Loaded halloysite tubules 26 (containing a deposit of benzotriazole 22 and polycation) may be separated from the suspension by centrifugation, washed with water to remove benzotriazole 22 and polycation from the exterior surfaces of loaded halloysite tubules 26, and dried.

With reference to FIG. 4, benzotriazole-and-polycation-loaded halloysite tubules may then be exposed to a bulk polyanion solution (instead of a transition metal ion solution) for the formation of end plugs 28. The bulk polyanion solution may be prepared in the same solvent as used for the polycation, or in any other ionic non-viscous solvent in which polyanion is soluble and halloysite can be dispersed (usually water). The concentration of polyanion should not exceed 0.5 weight percent. Polycation leaking from lumens 12 may react with polyanion in the bulk solution to form a precipitate end plug 28 on the basis of interpolyelectrolyte complex formed at openings 18, 20 effectively sealing these openings. In this embodiment, end plugs 28 are formed by the interaction of polyelectrolytes may prevent the release of benzotriazole 22 (or other anticorrosion agent) from lumen 12 until end plugs 28 dissipate.

Alternatively, polyanion may be loaded into lumen 12 and polycation may be used to rinse benzotriazole-and-polyanion-loaded halloysite tubules. Polycations may be polyallylamine, hydrochloride, polydimethyldiallyl ammonium chloride, chitosan, or dextran amine. Polyanions may be polystyrene sulfonate, polyacrylic acids, gelatin, or dextran sulfate.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

The invention claimed is:

1. A corrosion inhibiting structure comprising:
 a mineral tubule having a first end, a second end, and a lumen extending from said first end to said second end, wherein said lumen terminates in a first opening at said first end of said mineral tubule, and wherein said lumen terminates in a second opening at said second end of said mineral tubule;
 a deposit of one or more reagents disposed within said lumen, wherein said reagents comprise an anticorrosion agent; and
 a first precipitate stopper covering said first opening and a second precipitate stopper covering said second opening, wherein said first and second precipitate stoppers each comprise a precipitate formed by the interaction of said anticorrosion agent leaking from said lumen and one or more counter-reagents disposed outside of said mineral tubule, wherein said one or more counter-reagents comprise one or more metal ions, and wherein said anticorrosion agent is capable of forming a two-dimensional complex film with said one or more metal ions.

2. The corrosion inhibiting structure of claim 1, wherein said mineral tubule is a halloysite clay microtubule.

3. The corrosion inhibiting structure of claim 2, wherein said halloysite clay microtubule is in the size range of 15-50 nm in inner diameter, 50-200 nm in external diameter, and 500-3000 nm in length.

4. The corrosion inhibiting structure of claim 1, wherein said first and second precipitate stoppers have solubility values of less than $10^{-9}$ M in water.

5. The corrosion inhibiting structure of claim 1, wherein said anticorrosion agent is at least one of benzotriazole, hydroxyquinoline, 2-mercaptobenzothiazole, and 2-mercaptobenzimidazole.

6. The corrosion inhibiting structure of claim 1, wherein said metal ions are transition metal ions.

7. The corrosion inhibiting structure of claim 6, wherein said transition metal ions are at least one of copper(II), iron (II), iron(III), and cobalt(II).

8. A coating composition comprising a mixture of:
 a coating material; and one or more corrosion inhibiting structures, each corrosion inhibiting structure comprising: a mineral tubule having a lumen extending from a first opening on a first end of said mineral tubule to a second opening on a second end of said mineral tubule, a deposit of one or more reagents disposed within said lumen, said reagents comprising an anticorrosion agent, a first precipitate stopper covering said first opening, and a second precipitate stopper covering said second opening, wherein said first and second precipitate stoppers each comprise a precipitate formed by the interaction of said anticorrosion agent leaking from said lumen with one or more counter-reagents disposed outside of said mineral tubule, wherein said one or more counter-reagents comprise one or more metal ions, and wherein said anticorrosion agent is capable of forming a two-dimensional complex film with said one or more metal ions.

9. The coating composition of claim 8, wherein said coating material is capable of being mixed with a clay-based inorganic filler.

10. The coating composition of claim 8, wherein said coating material is at least one of an oil-based paint, an epoxy-based paint, an acrylic latex paint, and a polyurethane paint.

* * * * *